Sept. 10, 1935.  H. H. PICKRON  2,014,115
MOTOR TESTING APPARATUS
Filed April 25, 1932  2 Sheets-Sheet 1
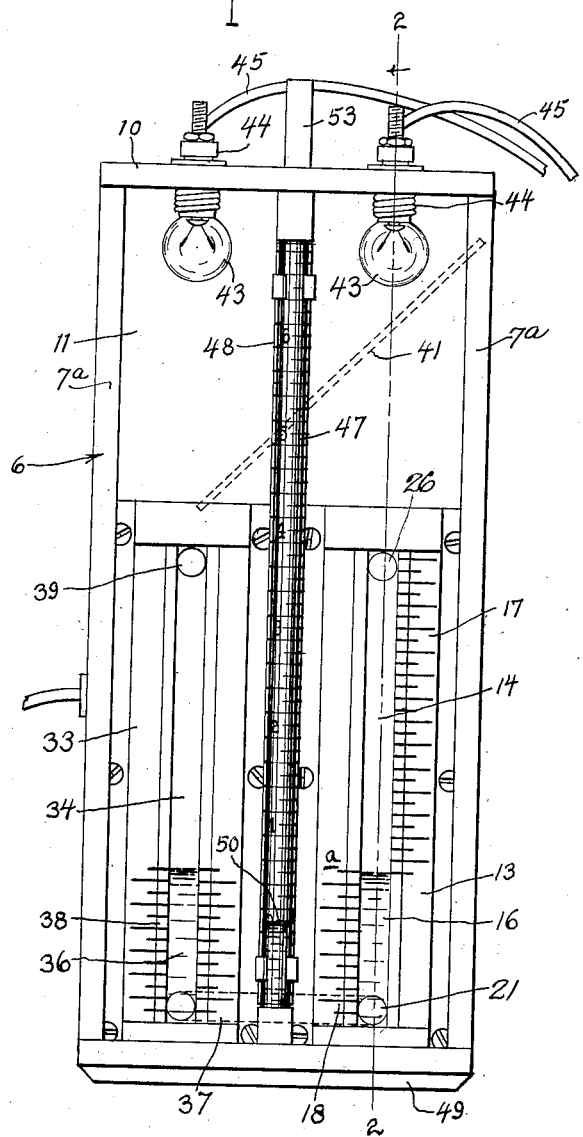
INVENTOR.
Hugo H. Pickron,
By Walter N. Haskell,
his ATTORNEY.

Sept. 10, 1935.  H. H. PICKRON  2,014,115
MOTOR TESTING APPARATUS
Filed April 25, 1932  2 Sheets-Sheet 2
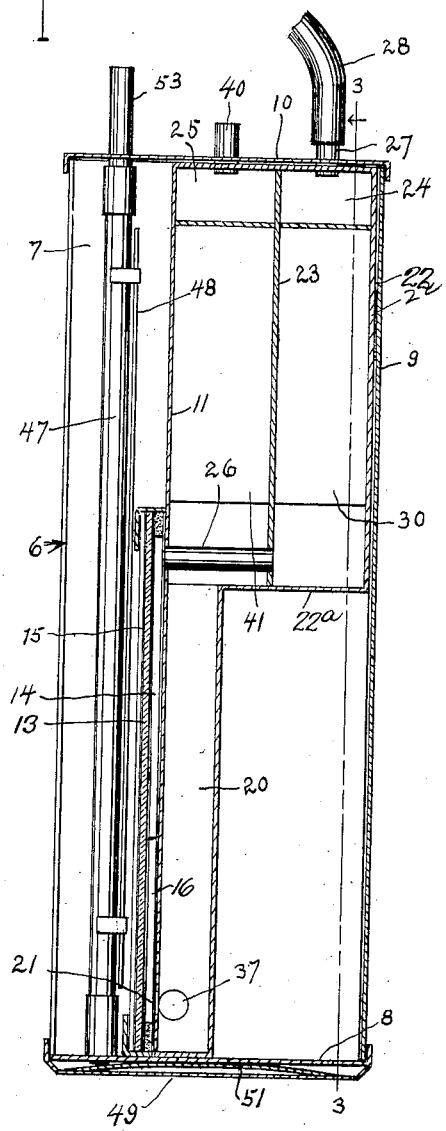
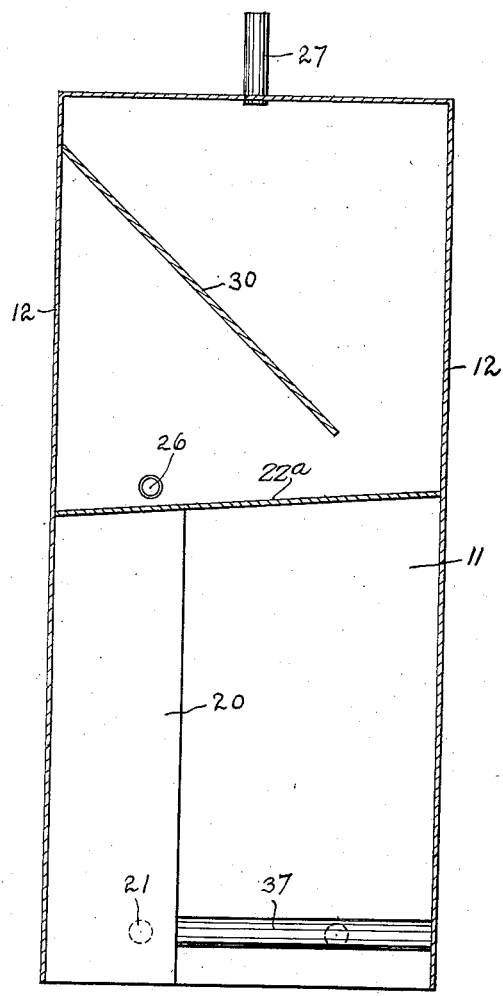
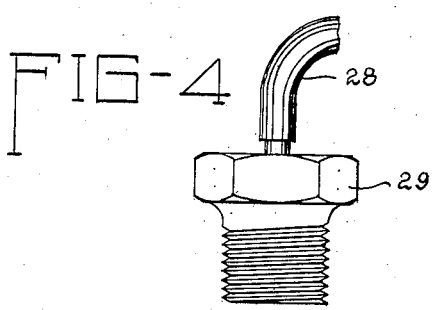
INVENTOR.
Hugo H. Pickron,
BY Walter N. Haskell.
his ATTORNEY.

Patented Sept. 10, 1935

2,014,115

UNITED STATES PATENT OFFICE 2,014,115

MOTOR TESTING APPARATUS

Hugo H. Pickron, Rock Island, Ill.

Application April 25, 1932, Serial No. 607,299

2 Claims. (Cl. 73—51)

My invention has reference to a motor testing apparatus, in which are embodied indicating devices and means for the connection thereof with one of the cylinders of a motor, so that said devices will respond instantly to the movements of the piston of such cylinder, and make it possible by reading such indicating devices to determine certain points pertaining to the action of the piston and requirements thereof. By this means it is possible to determine the dead center of the piston at the end of either the up or down stroke thereof, so that a proper adjustment of the breaker points can be made with relation thereto. Other uses can be made thereof, such as will be hereinafter more fully referred to.

The machine comprises primarily a casing and frame in which is supported a visual water gauge and source of supply for the liquid contents thereof. This gauge is also connected with an air control chamber which is in turn adapted for connection with the compression chamber of a motor, by replacing the usual spark plug of a cylinder with a similar plug forming the seating means for one end of a flexible conduit, the other end of which is connected with the chamber. Any change in the fluid conditions in the compression or explosion chamber is instantly reflected by the position of the water in the gauge, which is preferably supplied with some kind of coloring matter, so that the height of such liquid in the gauge can be more readily detected.

Associated with said primary gauge is a secondary gauge, also connected with a control chamber and indirectly with the primary gauge. One of the purposes of the secondary gauge is to indicate in connection with the first-named gauge when the instrument is in a level position, suitable for testing operations. The gauges and associated parts form a complete system permitting of great flexibility of movement of the liquid contents and of the air which is at times displaced thereby, so that there is no interference with the quick action thereof.

Besides the possibility of determining when the piston is on a dead center as above mentioned, the apparatus can be made use of to show when there are leaky piston rings or valves, determine the proper opening of the intake valve and of the proper closing of the exhaust valve, show piston travel at top center and past top center, indicate the intake of gas from the carbureter, the exact setting of the carbureter, locate missing spark plugs, show separation of breaker points, and the setting of breaker points for the proper synchronizing thereof. Additional visual means is also provided for aiding in the setting of the breaker points, consisting of small electric lights. These lights are also positioned in such a manner as to illuminate the gauges of the instrument, and render the same more easily read.

An auxiliary water tube is also provided for use in making some of the tests in conjunction with the other gauges, and which can also be used independently in taking carbureter readings.

The above named, and other features and advantages of the invention will more fully appear in the following specification, taken in connection with the accompanying drawings, in which:—

Fig. 1 shows the invention in front elevation.

Fig. 2 is a vertical section on the line 2—2 of Fig. 1 the lamp 43 being omitted to more fully disclose other parts.

Fig. 3 is a vertical section on the line 3—3 of Fig. 2.

Fig. 4 is a detail of the plug 29.

The reference number 6 indicates a casing for the apparatus, open at the front, and formed of side walls 7, provided at their front edges with inwardly turned flanges 7a, and united at the bottom by a floor plate 8 and at the rear by a back 9. Supported on the top of the casing is a cap-plate 10. Within the casing is a frame comprising a front plate 11 and side plates 12 at right angles therewith. Secured to one side of the front plate is a casing 13, within which is a space 14, between a glass 15 at the front and the plate 11 at the rear. Said space is adapted to hold a column of water or other liquid, as indicated at 16, which column stands normally at a neutral point, as indicated at a. At one side of the casing 13 on the glass 15 are graduated markings 17, extending upwardly from the neutral point, and at 18 similar markings project downwardly from the neutral point at the opposite side of the casing. In rear of the casing 13 is a casing 20 in the lower part of the frame just in rear of the space 14, and communicating with the lower end of the space 14 through an opening at 21, said casing being designed to hold a supply of liquid for use in the casing 13 and other parts of the apparatus, hereinafter specified.

In the upper part of the frame is a casing 22 provided with a floor 22a, sloping slightly toward the casing 20, which has an opening through said floor, divided by a partition 23 into compartments 24 and 25. The upper end of the space 14 is connected with the chamber 24 by means of a tubular connection 26, passing through the chamber 25, and in the upper wall of the chamber 24 is fixed a pipe 27, to receive one end of a flexible tube 28, the other end of which is fitted with a perforated plug 29 adapted for insertion in a spark-plug opening in place of the usual plug.
When thus connected a movement of the piston will be immediately imparted to the ribbon of liquid in the casing 13, causing the same to rise or fall according to the direction of movement of the piston. The chamber 24 is also provided with a baffle-plate 30, above the point of entry of the pipe 26, which prevents any liquid which may be drawn into the chamber from getting into the pipe 27. The operation will be hereinafter more fully set forth.
Fixed to the outer face of the plate 11 at the side opposite to the casing 13 is a similar casing 33, within which is a space 34, with a closure of glass in front similar to the glass 15 and backed by the plate 11. Said space is adapted to contain a column of liquid, as indicated at 36, the height of which is normally the same as that of the column 16, as indicated. The lower end of the space 34 is connected with the casing 20 by a pipe 37, and the front of the casing 33 is provided with graduated markings at both sides of the space 34 as at 38. The upper end of the space 34 is connected by a pipe 39 with the chamber 25, and in the upper part of said chamber is an air vent pipe 40. Said chamber is also provided with a baffle-plate as indicated at 41 in Fig. 1, similar to the baffle-plate 30, and for a similar purpose. The chamber 25 opens downwardly into the casing 20, permitting a free circulation of air or liquid through the gauges 14 and 34, the casing 20, and chamber 25.

Suspended in front of the plate 11 is a pair of small light globes 43, in fixtures 44 held in the cap-plate 10, and fitted with cords 45, the purpose of which lights will be hereinafter more fully explained. One of said lights is connected with each set of breaker-points, by having the wires 45 connected with the terminals of said breaker-points, and the lights provided with ground connections to the frame not shown in the drawings.

When it is desired to make use of the apparatus for testing a motor the spark plugs are all removed so as to offer as little resistance as possible to the operation of turning the crankshaft of the motor, and the plug 29 is substituted for one of said spark-plugs, and the other end of the tube 28 attached to the pipe 27. By turning the crank very gradually to move the piston in an upward direction a compression will result which will cause the liquid ribbon in 14 to fall. By short, intermittent movements of the crank the air displacement from the cylinder will pass through the chamber 24 to the liquid in the gauge. Just before the piston reaches dead center the liquid will become nearly stationary at the bottom of the gauge and as soon as dead center is passed the liquid rises quickly to neutral position. When dead center is reached, and indicated by the gauge, the necessary computations can be made for adjusting the positions of the breaker points. The positions of the breaker points can be further determined by means of the lights 43, by connecting the cords thereof with the breaker points. Each of said lights is adapted for independent action with one set of points, the pair of lights being suited for joint action with a motor having two sets of said points.

In the down movement of the piston the operation is the same, except that a suction is created, and the ribbon of liquid rises in the space 14, reaching to the top thereof, and possibly overflowing into the chamber 24. Upon the piston passing dead center at the lower end of the stroke the ribbon falls quickly until the upper end thereof is at neutral again. When it is shown that the piston is at dead center it is held in that position until the necessary adjustments of breaker points are made, if any are needed.

In the last operation, in case of a leakage in the piston rings or valves this will result in a lowering of the suction force, and the liquid in the gauge will move downwardly, instead of remaining stationary at the upper end of the gauge. In the same way, if the movement of the liquid has been toward the bottom of the gauge it will not stay there if there is a leakage in the valves or rings. In either case the liquid comes back to a neutral point.

When the liquid in both gauges is at a neutral point, as shown in Fig. 1, it shows that the instrument is setting in a level position, and any variation therefrom indicates the contrary, and calls for a correction in the position of said instrument before making a test. The liquid in the gauge 34 also assists in the freedom of movement of the liquid in the other gauge. In case of the movement of a considerable amount of liquid in the gauge 14 upwardly, tending to exhaust the supply in the casing 20, the liquid in the gauge 34 will move downwardly and through the pipe 37 into said casing. In a sudden movement of the liquid downwardly in the gauge 14 there is a possibility of the movement extending into the casing 20 and through the pipe 37 into the gauge 34, causing the liquid therein to fill such gauge and overflow into the chamber 25, from which it returns to the casing 20. This casing affords relief in the first instance to any forceful entry of the liquid into the lower part thereof, but the other connections provide a counterbalancing effect, with no hindrance to the prompt action of the liquid medium at all times. If a compressive movement in the cylinder tends to cause an excess of liquid and air in the apparatus, the excess passes out through the vent 40 in the shape of air, and in case of a lack of supply in the instrument additional air comes in through said vent 40. The liquid medium can also be introduced into the apparatus through said vent, at which time the pipe 27 will be unobstructed. The contents of the instrument are at all times in such a state of equilibrium that the liquid in the gauge 14 will respond to a movement in a piston connected up therewith to the extent of one ten-thousandth of an inch.

In practice it has been found to be essential to the successful operation of the machine that the chambers 24 and 25 be in a higher position than that of the gauge mechanism, as clearly shown in the drawings.

If it is desired to locate the position of the exhaust valve or of the intake valve this can be done by slowly cranking the motor and noting the action of the liquid in the gauge 14. This is done after the downward power stroke following the explosion of gas, during which the valves are closed. When the piston reaches the lower dead center point the exhaust valve opens, allowing the expulsion of burned gases, during which action the liquid in chamber 24 returns automatically to the gauge 14, and falls to a point therein at or near neutral. When the gases are expelled the exhaust valve closes and the intake valve opens, as a result of which the liquid rises in gauge 14 to a point from one to three inches above neutral, and then drops back to neutral.

In order to determine the intake of gas mixture from the carbureter when the intake valve is open, short movements are given to the crank of the motor, causing the liquid in gauge 14 to rise by intermittent movements until such time as the cylinder is filled with the gas mixture. Upon the piston reaching the lower dead center the intake valve closes ready for the compression stroke. This is noted at once by the falling of the ribbon of liquid back to neutral.

At a central point in the front of the casing is shown a glass tube 47, in rear of which is supported a narrow strip 48, containing markings which are readable through the tube. This tube is connected with a hollow base-plate 49, containing a supply of liquid, a portion of which extends upwardly into the tube at 50, and stands normally at a point marked O. Within the base is a diaphragm 51 permitting a downward movement of the column of water in the tube upon a compressive force being applied at the upper end of the tube, and depressing the diaphragm, and returning the column of water to the tube after it has been depressed by resilient force of the diaphragm. At its upper end the tube 47 is connected with a pipe 53 in the cap-plate 10, adapted to receive the end of the tube 28, for connection with the motor cylinders. Movements of a piston can thereupon be imparted to the liquid in the tube 47, causing a movement of said liquid similar to that of the liquid in the gauge 14.

What I claim, and desire to secure by Letters Patent, is;

1. A motor testing apparatus, comprising a casing, a gauge mounted therein provided with a liquid indicating medium, the level of which is held normally at a neutral point, a supply tank for said medium in communication with the lower end of said gauge, an air chamber in communication with the upper end of said gauge, and adapted for connection with a motor cylinder, a baffle plate in said chamber adapted to prevent the escape of liquid therefrom, an air relief chamber communicating with said supply tank, and provided with an air vent, and a baffle plate in said last-named chamber preventing the escape of liquid outwardly therefrom.

2. A motor testing apparatus, comprising a casing, a primary gauge mounted therein and provided with a liquid indicating medium, a supply tank communicating with the lower end of said gauge and containing a supply of the liquid medium, an air chamber communicating with the upper end of said gauge, means of communication between said chamber and a motor cylinder, an air relief chamber communicating with said tank and provided with an air vent, a secondary gauge communicating with said air relief chamber, and a connection between said secondary gauge and said supply tank, the liquid medium being normally at the same height in both gauges.

HUGO H. PICKRON.